US 6,571,614 B1

(12) United States Patent
King, II et al.

(10) Patent No.: US 6,571,614 B1
(45) Date of Patent: Jun. 3, 2003

(54) INJECTION PRESSURE SENSOR SEALING MECHANISM

(75) Inventors: Lamar L. King, II, Dearborn, MI (US); Gregory Michael Ostroski, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/487,063

(22) Filed: Jan. 19, 2000

(51) Int. Cl.[7] .............................................. G01M 15/00
(52) U.S. Cl. ....................................... 73/119 A; 73/738
(58) Field of Search ............................... 73/119 A, 700, 73/706, 738

(56) References Cited

U.S. PATENT DOCUMENTS 5,605,133 A * 2/1997 Tuckey ....................... 123/458
6,089,470 A * 7/2000 Teerman et al. .............. 239/88
6,196,199 B1 * 3/2001 Jiang ........................... 123/506

* cited by examiner

Primary Examiner—Hezron Williams
Assistant Examiner—Andre Allen
(74) Attorney, Agent, or Firm—Frank A. MacKenzie

(57) ABSTRACT

An injection pressure sensor (10) intended for use with a fluid source (12). The injection pressure sensor (10) has a sensor element (14) in communication with the fluid source (12) and in communication with a pressure reference source (16). The injection pressure sensor (10) also includes a sensor body (20) and a plunger element (26). If the injection pressure sensor (10) experiences high fluid pressures, the sensor element (14) can fail and fluid can escape past the sensor element (14). When the sensor element (14) fails, the plunger element (26) moves from an inactive position (28) into an active position (32). When the plunger element (26) is in the active position (32), fluid is generally prevented from escaping the sensor body (20).

20 Claims, 1 Drawing Sheet

INJECTION PRESSURE SENSOR SEALING MECHANISM

TECHNICAL FIELD

The present invention relates generally to an injection pressure sensor and more particularly to an injection pressure sealing mechanism to minimize fuel leakage in the event of damage to the pressure sensor.

BACKGROUND ART

Injection pressure sensors (IPS) are well known in the automotive industry. Injection pressure sensors are commonly mounted directly to the fuel rail. IPS devices are used to monitor the pressure of the fuel within the fuel rail relative to the manifold pressure to assist in the regulation and control of the fuel injectors.

Performance issues alone do not govern the design of IPS devices. Modern automotive design is not only driven by cost and performance concerns, but also by other complications resulting from part failure. Systems within an automobile are often designed such that when failure occurs, safety issues or costly repairs do not occur. If these issues are not adequately addressed, the resulting costs and other complications can diminish customer satisfaction. Reduction in customer satisfaction is often highly undesirable.

Part failure must be considered in evaluating the design of an IPS device as well. IPS devices commonly are attached to the fuel rail on one end and are exposed to the manifold absolute pressure (MAP) on the other. In this way the pressure differential between the fuel and the manifold is determined and the fuel injector control can be varied accordingly. A variety of conditions, however, are known that can increase the pressure of the fuel to a point where it can damage the IPS. This increase in pressure can be brought on by a malfunctioning fuel pump, a vehicle crash, or another system failure within the automobile.

When extreme fuel pressure levels are reached, it the sensor within the IPS device can be damaged. If the sensor breaks, fuel can pass through the IPS device and enter the manifold. This is undesirable for a variety of reasons, since fuel can possibly escape outside the engine, or provide such an overly-rich fuel operating condition which can damage the engine.

It would therefore be desirable to have a design for an IPS that can be exposed to high fuel pressures and not be adversely affected or cause fuel leakage past the IPS.

SUMMARY OF THE INVENTION

It is therefore an object of the present invention to provide an injection pressure sensor that minimizes fluid leakage from a fluid source when the pressure sensor is damaged due to extremely high fluid pressure levels.

In accordance with the object of this invention a injection pressure sensor is provided which includes a sensor element in communication with a fluid source and additionally in communication with a pressure reference source. The sensor element measures the difference in pressure between the fluid source and the pressure reference source.

The injection pressure sensor further includes a plunger element positioned within the sensor body with an active position and an inactive position. If the sensor element becomes damaged and fluid from the fluid source enters the sensor body, the plunger element moves from its inactive position to its active position. When the plunger element is in the active position fluid from the fluid source is maintained within the sensor body.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
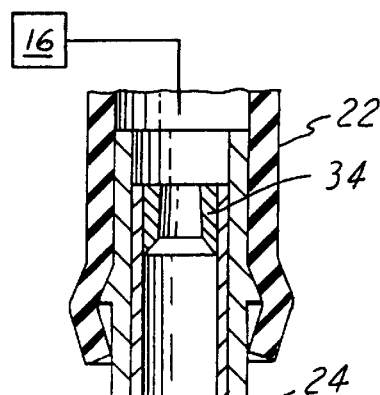
FIG. 1 is an illustration of an embodiment of an injection pressure sensor in accordance with the present invention, the plunger element shown in the inactive position.
Figure 1:
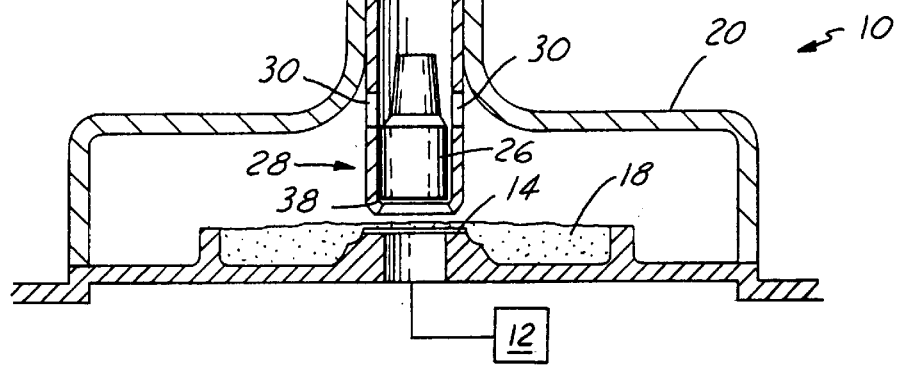

Referring now to FIG. 1, which is an illustration of an injection pressure sensor 10 in accordance with the present invention. Although the injection pressure sensor 10 is intended for use in automotive fuel injection applications, the injection pressure sensor 10 is capable of being used in a variety of fluid applications including non-automotive applications.

The injection pressure sensor 10 is intended for use with a fluid source 12. In one embodiment, the fluid source 12 is a fuel rail. A sensor element 14 is positioned in communication with said fluid source 12. The sensor element 14 is further in communication with a pressure reference source 16. In one embodiment, the pressure reference source 16 is the manifold absolute pressure. In this fashion, the sensor element 14 can measure the pressure differential between fluid in said fluid source 12 and said pressure reference source 16. Using a sensor element 14 to measure the difference in pressure between a fuel rail and manifold absolute pressure is common in automotive fuel injector applications. In one embodiment the sensor element 14 is attached directly to the fluid source 12, although in other embodiments it need not be. The sensor element 14 can be, for example, a silicon wafer, although a variety of other sensor elements 14 can be used.

The sensor element 14 is preferably positioned such that in normal operating conditions, the fluid from said fluid source 12 does not pass past the sensor element 14 and escape from the sensor body. In one embodiment, a protective gel 18 covers the sensor element 14 to hold the sensor element 14 in place and to prevent fluid leakage from the fluid source during normal operation. The use of protective gel 18 allows the sensor element 14 to be adequately sealed and held in place while not interfering with the communication between the sensor element 14 and the pressure reference source 16. Although the protective gel 18 has been described, the sensor element 14 may be attached to the fluid source 12 in a variety of known ways that prevent fluid leakage from the fluid source during normal operation.

The sensor element 14 and the protective gel 18 are contained within the sensor body 20. The sensor body 20 is preferably comprised of a polymer material, although a variety of materials may be used. A hose element 22 may be attached to the sensor body 20 to keep the sensor body 20 in communication with the pressure reference source 16, although a variety of methods of keeping the sensor body 20 in communication with the pressure reference source 16 are available.

A tube member 24 is positioned within the sensor body 20. In one embodiment the tube member 24 is made of steel, although a variety of materials could be used. The tube member 24 is used to provide communication between the pressure reference source 16 and the sensor element 14 as well as to house a plunger element 26. Although a separate tube member 24 is described, the sensor body 20 and the tube member 24 can be formed as a single element. During normal operation of the injection pressure sensor 10, the plunger element 26 remains in the inactive position 28, as shown in FIG. 1. At least one bypass port 30 allows the sensor element 14 to remain in communication with the pressure reference source 16 when the plunger element 26 is in the inactive position. Although two bypass ports 30 are shown in FIG. 1, the number and position of the bypass ports 30 may be varied.

Figure 2:
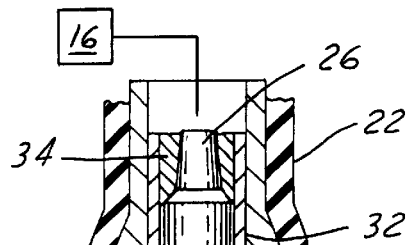
FIG. 2 is an illustration of an embodiment of an injection pressure sensor in accordance with the present invention, the plunger element shown in the active position.
Figure 2:
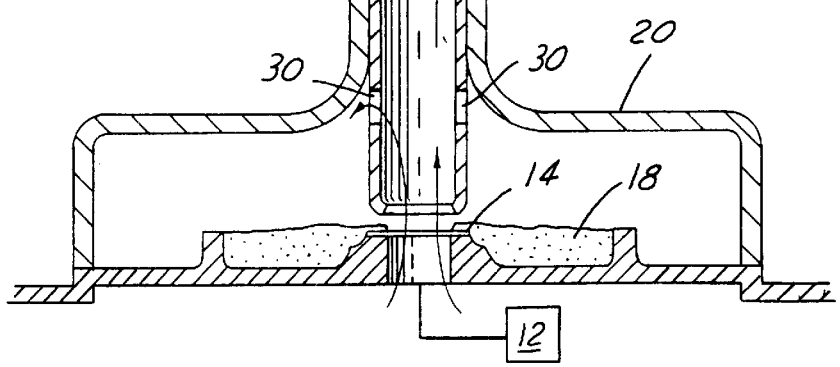

During normal operation, the plunger element 26 remains in its inactive position 28 and the sensor element 14 remains in communication with the pressure reference source 16. Normal operating pressures in a fuel system are typically in the area of 30 psi to 65 psi. If the fluid from the fluid source 12 reaches very high pressures such as 400 psi over a period of 20 microseconds for example, it can damage the sensor element 14. When this happens, fluid can escape past the sensor element 14 and into the sensor body 20. When this happens, the flow of fluid into the sensor body 20 moves the plunger element 26 from its inactive position 28 into its active position 32, as shown in FIG. 2. In a different embodiment, the flow of fluid into the sensor body 20 need only dislodge the plunger element 26 such that the bypass ports 30 are covered. Once the plunger element 26 blocks the bypass ports 30, a vacuum will be created by the pressure reference source 16 which moves the plunger element 26 into the active position 32.

When the plunger element 26 is in its active position 32, fuel from the fuel source 12 becomes trapped within the sensor body 20 and fuel leakage from the injection pressure sensor 10 is minimized thereby reducing possible damage issues to the engine and vehicle occupants.

An annulus element 34 may be positioned in the tube member 24 to stop the plunger element 26 at its active position 32. In one embodiment, fluid pressure from the fluid source 12 holds the plunger element 26 in its active position 32. In another embodiment the annulus element 34 and the plunger element 26 can be formed such that the plunger element 26 forms a weak press fit with the annulus element 34 when the plunger element 26 is in the active position 32 thus keeping the plunger element 26 in the active position 32 even after fluid pressure is lost. Although the annulus element 34 and the plunger element 26 were described as forming a weak press fit, a variety of known formations are possible that would allow the plunger element 26 to remain in the active position 32 even after fluid pressure is lost. In addition, vacuum pressure from the pressure reference source 16 alone may be used to keep the plunger element 26 in the active position 32. Although an annulus element 34 has been described, the tube member 24 may be formed in a variety of shapes relative to the plunger element 26 such that the sensor body 20 is generally sealed when said plunger element 26 is in the active position 32.

The plunger element 26 may in addition be held in its inactive position 28 with a fluid soluble seal 38. The fluid soluble seal 38 can be any of a variety of adhesives that dissolve when exposed to the fluid. A variety of adhesives are known that dissolve when exposed to fuel, such as latex and are suitable in the present application. Although the plunger element 26 may be used without the fluid soluble seal 38, the fluid soluble seal 38 can prevent the plunger element 26 from accidentally moving into the active position 32. When the fluid in the fluid source 12 reaches high levels and breaks through the sensor element 14, the fluid soluble seal 38 dissolves and the plunger element 26 moves easily to its active position 32. In a different embodiment, the plunger element 26 may be held in its inactive position 28 through the use of a pin (not shown) that breaks away when fluid breaks through the sensor element 14. In other embodiments the plunger element 26 may be held in its inactive position 28 by a variety of methods to prevent the plunger element 26 from accidentally moving into the active position 32 prior to the breaking of the sensor element 14.

While particular embodiments of the invention have been shown and described, numerous variations and alternate embodiments will occur to those skilled in the art. Accordingly, it is intended that the invention be limited only in terms of the appended claims.

What is claimed is:

1. An injection pressure sensor comprising:
    a sensor element in communication with a fluid source and in communication with a pressure reference source;
    a sensor body; and
    a plunger element positioned within said sensor body, said plunger element having an active position and an inactive position, wherein upon failure of said sensor element said plunger element enters said active position and fluid from said fluid source is generally prevented from escaping said sensor body.

2. An injection pressure sensor as described in claim 1, wherein said fluid source is a fuel rail.

3. An injector pressure sensor as described in claim 1, further comprising a protective gel in contact with said sensor element and positioned between said sensor element and said pressure reference source.

4. An injector pressure sensor as described in claim 1, wherein said pressure reference source is a manifold absolute pressure.

5. An injector pressure sensor as described in claim 1, wherein said sensor element is comprised of a silicon wafer.

6. An injector pressure sensor as described in claim 1, for use in an automotive fuel injection system.

7. An injector pressure sensor as described in claim 1, further comprising:
    a hose element connecting said sensor body to said pressure reference source.

8. An injection pressure sensor as described in claim 1, further comprising:
    a tube member positioned within said sensor body, said tube member housing said plunger element; and
    at least one bypass port allowing communication between said sensor element and said pressure reference source while said plunger element is in said inactive position.

9. An injection pressure sensor as described in claim 8 wherein said at least one bypass port comprises at least one hole formed in said tube member in a position above said plunger element when said plunger element is in said inactive position.

10. An injection pressure sensor as described in claim 8, further comprising:
    an annulus element positioned within said tube member, said annulus element creating a seal between said plunger element when in said active position and said tube member.

11. An injection pressure sensor comprising:
    a sensor element in communication with a fluid source and in communication with a pressure reference source;

a sensor body;

a plunger element positioned within said sensor body, said plunger element having an active position and an inactive position, wherein upon failure of said sensor element said plunger element enters said active position and fluid from said fluid source is generally prevented from escaping said sensor body;

a tube member positioned within said sensor body, said tube member housing said plunger element; and at least one bypass port allowing communication between said sensor element and said pressure reference source while said plunger element is in said inactive position.

12. An injection pressure sensor as described in claim 11, wherein said at least one bypass port comprises at least one hole formed in said tube member in a position above said plunger element when said plunger element is in said inactive position.

13. An injection pressure sensor as described in claim 11, wherein said plunger element is prevented from accidentally moving from said inactive position through the use of a gas-soluble seal.

14. An injection pressure sensor as described in claim 11, wherein said plunger element is prevented from accidentally moving from said inactive position through the use of a break-away pin.

15. An injection pressure sensor as described in claim 11, wherein when said plunger element is in said active position, said plunger element is held in place by vacuum pressure.

16. An injection pressure sensor as described in claim 11, further comprising:

a protective gel in contact with said sensor element and positioned between said sensor element and said pressure reference source.

17. An injector pressure sensor as described in claim 11, wherein when said plunger element moves from said inactive position, said at least one bypass port becomes closed and a vacuum forces said plunger element into said active position.

18. An injector pressure sensor as described in claim 11, further comprising:

an annulus element positioned within said tube member, said annulus element creating a seal between said plunger element when in said active position and said tube member.

19. An injector pressure sensor as described in claim 18, wherein said annulus element and said plunger element form a weak press fit when said plunger element is in said active position.

20. A method for preventing fluid leaks from an injector pressure sensor having a sensor element, a sensor body, and a plunger element comprising the steps of:

moving said plunger element from an inactive position to an active position upon the breakage of said sensor element;

sealing said sensor body using said plunger element such that fluid escaping past said broken sensor element remains within said sensor body.

* * * * *